April 22, 1952 — W. M. WALTERS, JR., ET AL — 2,593,944
UTILITY GARDEN TOOL
Filed May 9, 1946 — 3 Sheets-Sheet 1
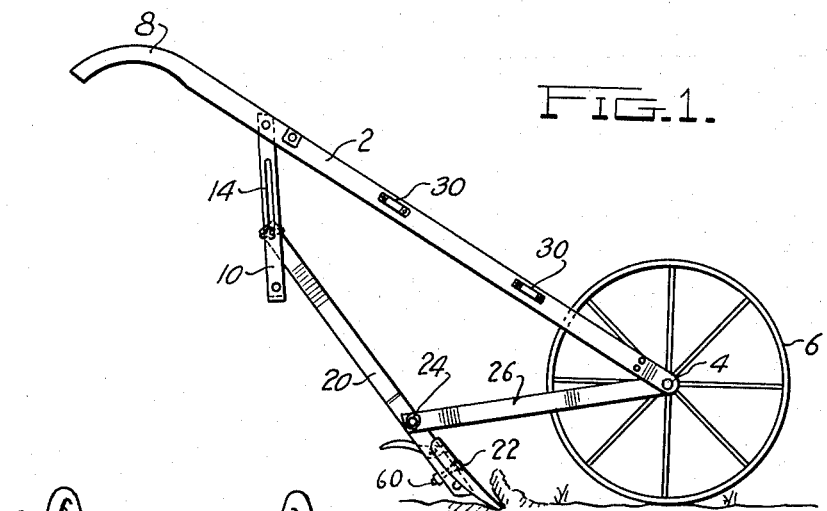
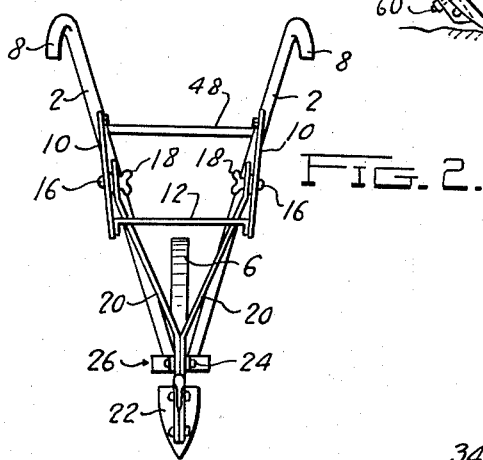
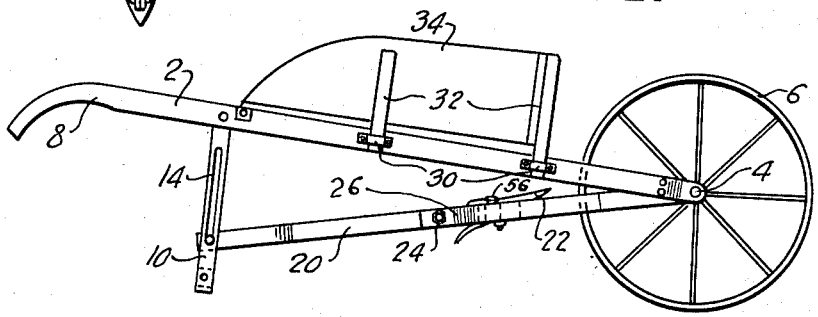
INVENTORS
William M. Walters Jr.
& Walter J. Sampson
BY
Hauke & Hardesty
ATTORNEYS April 22, 1952    W. M. WALTERS, JR., ET AL    2,593,944
UTILITY GARDEN TOOL
Filed May 9, 1946      3 Sheets-Sheet 2
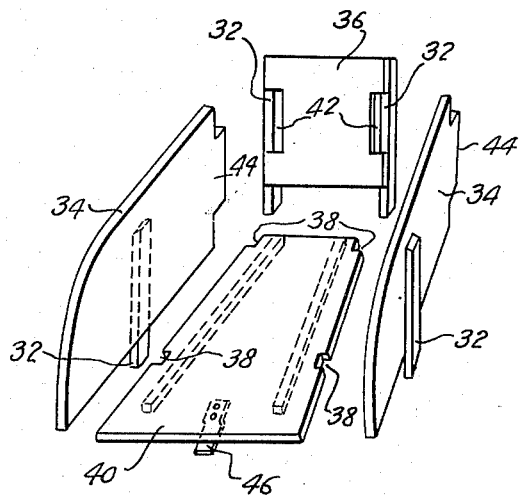
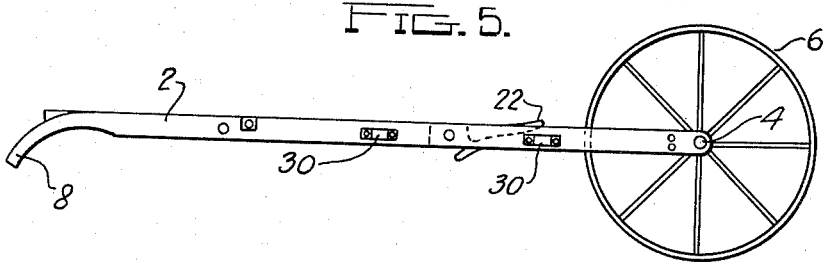

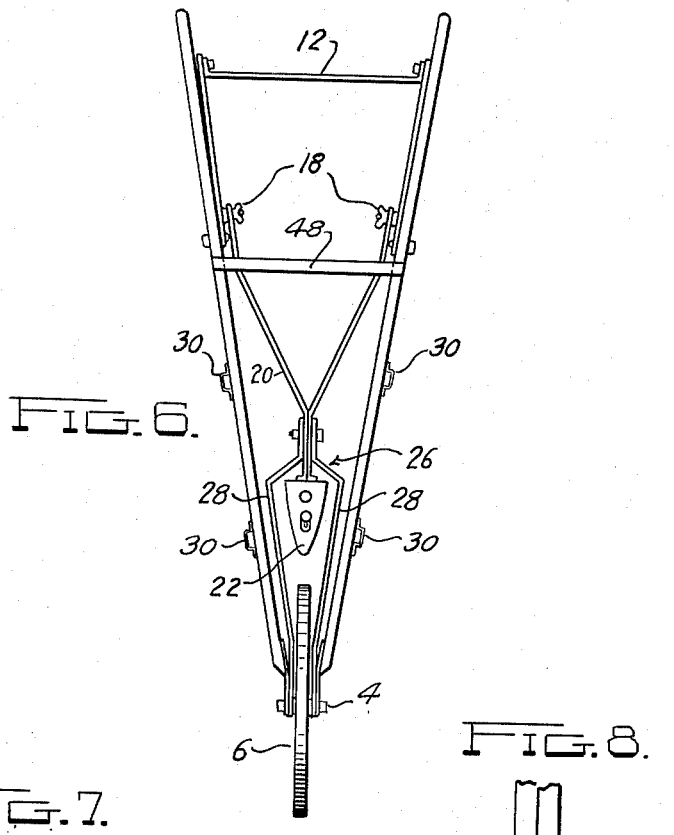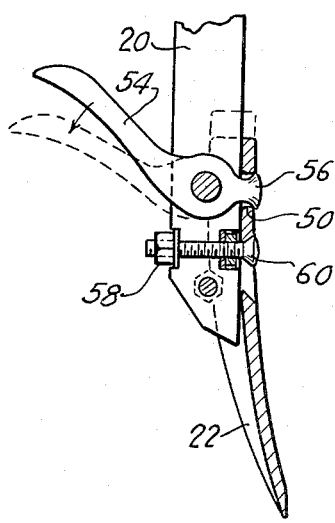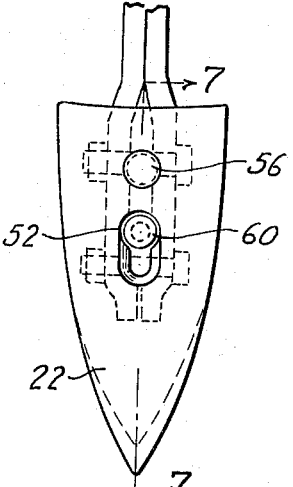

Patented Apr. 22, 1952

2,593,944

UNITED STATES PATENT OFFICE 2,593,944

UTILITY GARDEN TOOL

William M. Walters, Jr., Eleanor, and Walter J. Sampson, Nitro, W. Va.

Application May 9, 1946, Serial No. 668,427

5 Claims. (Cl. 97—59)

This invention relates to a utility garden tool, particularly to a garden tool which is easily converted from a tool serving one purpose, such as a plow, to a tool serving another purpose, such as a wheelbarrow.

Most small-scale gardeners find themselves at a disadvantage in trying to obtain adequate tools at low cost. The truck gardener who has a substantial acreage to till can afford to lay in a supply of specialized tools because the tools represent a small percentage of his total capital outlay. The small gardener, on the other hand, cannot afford to spend much on tools if his gardening is to be economically practical. If possible, the small-scale gardener should make one tool do the work of several.

It is the object of this invention to provide a single garden tool which is adaptable to a plurality of uses. More specifically, this invention provides a garden tool in the form of a frame which is so made that it can be adjusted to take the form and serve the purpose of a plow or other earth-working instrument, and with a few minor adjustments be converted into a practical and useful wheelbarrow.

In the drawings:

Fig. 1 is a side elevation view of the invention arranged to operate as an earth working tool or plow.

Fig. 2 is a rear elevation view of the tool shown in Fig. 1.

Fig. 3 is a side elevation view of the tool arranged to operate as a wheelbarrow.

Fig. 4 is an exploded view of the wheelbarrow body parts.

Fig. 5 is a view of the tool folded flat for storage purposes.

Fig. 6 is a plan view of the tool folded up as in Fig. 5, and

Figs. 7 and 8 are detail views of the earth working instrument, Fig. 7 being a partial section on line 7—7 of Fig. 8.

Referring now especially to Figs. 1 and 2, two shafts 2 are arranged to converge upon a common support 4 which comprises an axle upon which wheel 6 is rotatably mounted. Handles 8 may be provided at the ends of shafts 2 opposite the support.

A plurality of hingedly connected members are supported by and between shafts 2 and the common support 4. These hingedly connected members comprise bars 10 which are hinged at one end to shafts 2 near the handles. At the other ends of bars 10, these bars are reinforced and connected by a transverse member 12. Bars 10 are provided with slots 14 which cooperate with the head of a bolt 16. Each bolt 16 is adapted to slide in its slot 14 and is held against sliding by a wing nut 18 which tightens the bolt against movement. Each of bolts 16 supports one end of link 20. Links 20 converge forwardly to support an earth-working instrument 22. Details of mounting instrument 22 will be discussed below.

Links 20 are held together at their forward and lower end by a suitable fastening means such as bolt and nut assembly 24 which also secures to the links 20 one end of a brace 26. As is perhaps best shown in Fig. 6, brace 26 comprises two members 28 which are spaced apart intermediate their joined ends to form a recess capable of receiving earth-working instrument 22 when the garden tool is folded flat as shown in Figs. 5 and 6. At their forward ends, the members 28 are carried by the common support 4.

Shafts 2 are provided with a plurality of straps 30 which form loops capable of cooperating with cleats 32 on the side and end pieces 34 and 36 respectively of the wheelbarrow body (see Fig. 4). Cleats 32 cooperate with recesses 38 in the floor member 40 of the wheelbarrow body to assist in holding the body in assembly on the shafts 2. The end member 36 is provided with recesses 42 which are adapted to receive tongues 44 on side members 34, also to assist in holding the body pieces together when the garden tool is used as a wheelbarrow.

An open ended clamp is formed by projection 46 on the underside of floor member 40. Projection 46 and floor member 40 cooperate with a transverse brace 48 between shafts 2 to hold the assembled body down in position on the shafts 2.

Referring now particularly to Figs. 7 and 8, it will be seen that earth-working instrument 22 is provided with a substantially circular opening 50 near its upper edge and an elongated opening 52 located about centrally of the instrument 22. It will be noted that opening 52 is wider at the top than at the bottom. At the lower ends of links 20 there is disposed a pivotally mounted pedal 54 having forwardly extending projection 56 which is adapted to cooperate with the opening 50. A nut and bolt assembly 58 having a projecting head 60 is adapted to cooperate with the elongated opening 52. Head 60 is undercut as shown in Fig. 7 for sliding cooperation with the narrow portion of opening 52.

Operation

When it is desired to use the utility garden tool of this invention as a plow, the hingedly connected members 10, 20, and 26 are arranged to take substantially the relative position shown in Fig. 1, after which wing nuts 18 are clamped tight to hold the members in place.

The earth working instrument 22 may be removed for sharpening or to be replaced by another instrument by applying foot pressure to the underside of the back end of pedal 54. Projection 56 will thereupon slide plow 22 downwardly until head 60 is in position in the large end of opening 52, as shown in Figs. 7 and 8. The plow may thereupon be removed. To replace plow 22, it is put on the lower end of links 20 in such a way that head 60 enters the large end of opening 52 and projection 56 enters opening 50. Pressure is then applied to the upper side of pedal 54 to slide the plow 22 into its working position.

If it is desired to use the utility garden tool of this invention as a wheelbarrow, wing nuts 18 will be loosened, the hingedly connected members will be arranged to occupy the position shown in Fig. 3, and the wheelbarrow body pieces shown in Fig. 4 will be assembled on the framework of the garden tool. For storage purposes the wheelbarrow body (Fig. 4) can be "knocked down" or disassembled and the pieces laid flat. Wing nuts 18 can be loosened and the hingedly connected members arranged to lie in the plane of the shafts 2, or, strictly speaking, these hingedly connected members will be arranged to lie between two planes, one of these planes being defined by the upper edge of shafts 2 and the other plane being defined by the lower edge of shafts 2.

It will of course be evident that the wheelbarrow body may be assembled on the framework of the tool with the hinged members occupying the position shown in Fig. 1. This arrangement may be desirable for planting operations if it is desired to carry the seed right along with the plow as a row is formed in the ground for the seed.

For use in rough ground or other circumstances in which the hingedly connected members might be subjected to unusually heavy stresses, it may be found desirable to provide a wing nut and bolt assembly at the point of juncture of links 20 and brace 26 in place of the conventional nut and bolt assembly 24.

We claim:

1. A garden tool for use as a wheelbarrow or earth tool comprising a pair of shafts spaced at one end and converging at their other end upon a wheel support, a wheel rotatably mounted on the support, a plurality of pairs of hingedly connected members supported by and between the shafts and the wheel support, and an earth working instrument mounted on one of said pairs of members, all of said members being so hinged together as to allow one position for the members in which the earth working instrument may engage the earth, and another position in which two of the members depend downwardly from the shafts to provide two supports for the garden tool and the other members reinforce the supports, the wheel supplying a third support.

2. A garden tool comprising a pair of shafts spaced at one end and converging at their other end upon a wheel support, a wheel rotatably mounted on the support, a plurality of pairs of hingedly connected members supported by and between the shafts and the wheel support, and an earth working instrument mounted on one of said pairs of members, all of said members being adjustable into a plurality of positions, one of the positions being such that said instrument may engage the earth, a second position being such that the members are all disposed in the plane of the shafts, and a third position being one in which some of the members depend downwardly from the shafts to support the garden tool on the ground, the wheel forming another support.

3. In a garden tool to serve as an earth-working machine and a wheelbarrow of the type having a pair of shafts provided with spaced handles at one end and converging upon a ground wheel at the other end, a plurality of members connecting the wheel support and each shaft at a point substantially to the rear of the shaft to form symmetrical reinforcing frames below each shaft, said members being relatively and selectively movable to change the shape of said frame, means for mounting an earth-working instrument on an opposed pair of said members at a point where an end of said pair of members projects downwardly beyond the other members whereby said earth-working instrument contacts the earth when the handle ends of the shafts are relatively high off the ground at about elbow level, the members being movable to another position and frame shape in which another opposed pair of the members depend downwardly from the shafts and project ends beyond the other members to provide ground supports for the handle end of said shafts at about knee level.

4. A garden tool as defined in claim 3 in which the elements of the symmetrical reinforcing frames are shiftable all within the plane of the shafts for purposes of storage.

5. A garden tool as defined in claim 3 in which the members forming the symmetrical reinforcing frames each consist of one member pivotally connected to the handle end of the shaft, a second member pivotally connected to the wheel end of the shaft and an intermediate member pivotally connected between said first and second members, the intermediate member serving to mount the earth-working tool and the first member serving as a leg support for the shafts in the lower position.

WILLIAM M. WALTERS, Jr.
WALTER J. SAMPSON.

REFERENCES CITED

The following references are of record in the file of this patent:

UNITED STATES PATENTS

| Number | Name | Date |
|---|---|---|
| 282,202 | Lee | July 31, 1883 |
| 479,706 | Dexter | July 26, 1892 |
| 801,381 | Jones | Oct. 10, 1905 |
| 872,926 | Gates | Dec. 3, 1907 |
| 897,094 | Hancock | Aug. 25, 1908 |
| 944,291 | Spangler | Dec. 28, 1909 |
| 1,009,824 | Birdsong | Nov. 28, 1911 |